UNITED STATES PATENT OFFICE.

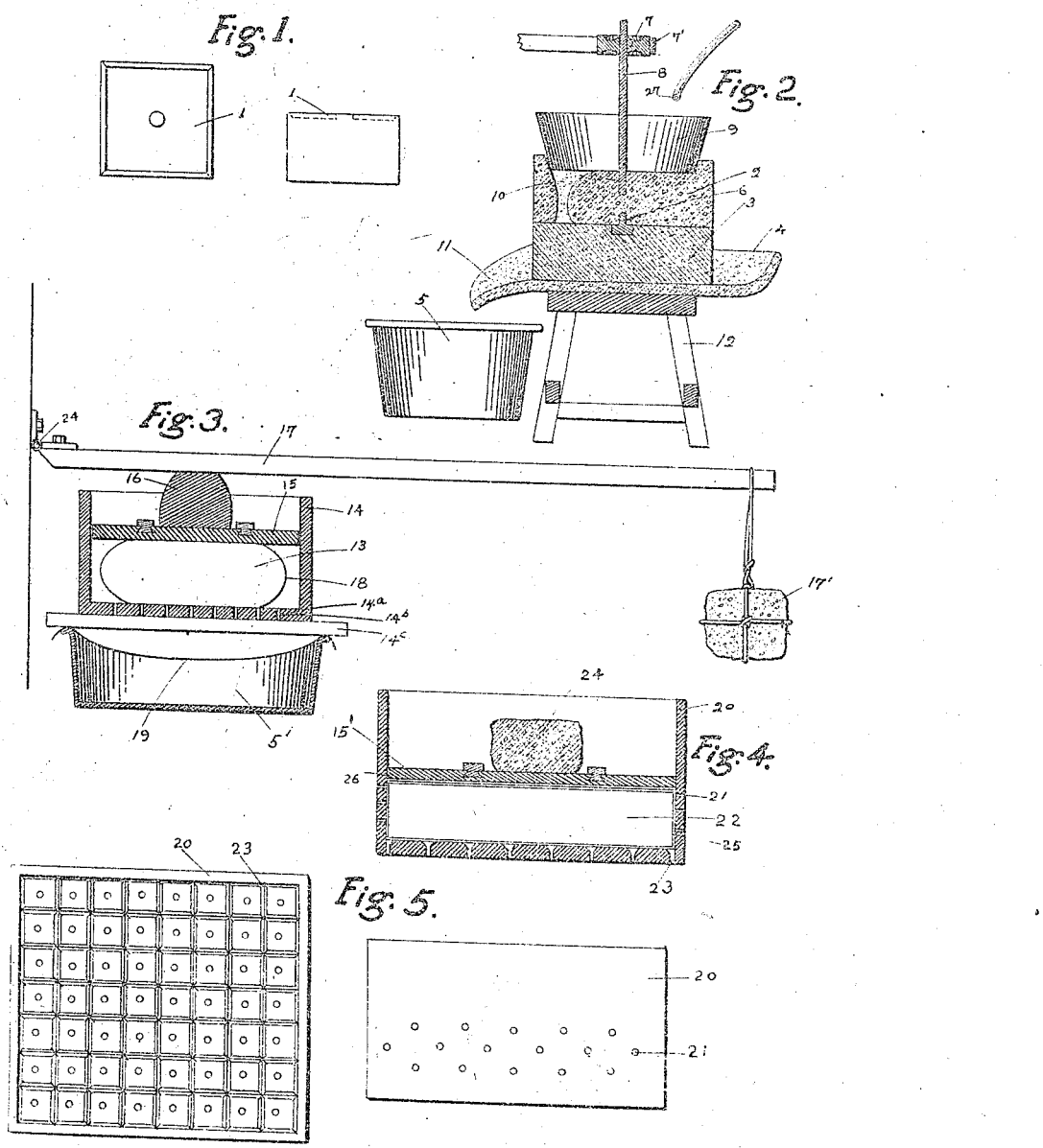

KAMEKICHI MURAKAMI, OF SEATTLE, WASHINGTON.

BEAN-CURD AND THE PROCESS FOR MAKING SAME.

1,195,843.  Specification of Letters Patent.  Patented Aug. 22, 1916.

Application filed March 11, 1916. Serial No. 83,649.

*To all whom it may concern:*

Be it known that I, KAMEKICHI MURAKAMI, a subject of the Emperor of Japan, residing at Seattle, in the county of King and State of Washington, have invented certain new and useful Improvements in Bean-Curds and the Process for Making Same; and I do hereby declare the following to be a full, clear, and exact description of the invention, such as will enable others skilled in the art to which it appertains to make and use the same.

This invention relates to process and apparatus for making bean cubes, and particularly to the process of making the product from beans known as the "soy" bean, raised largely in Korea and Japan and to some extent in California.

The process comprises the several steps employed in reducing the beans to a creamy or jelly-like substance with the skins removed, and cutting the jelly into cubes or other forms for ready use in cooking; and the apparatus comprises the several utensils used in such process, as more fully shown in the drawings, in which—

Figure 1 gives a plan and a side view of one of the cubes. Fig. 2 is a vertical sectional view of the grinder for reducing the beans to a pulpy mass. Fig. 3 is a similar view of the strainer for pressing the pulp from the skins. Fig. 4 is a similar view of the press for squeezing the water from the pulp and reducing the latter to a jelly-like mass. Fig. 5 is a detail of the bottom plate and one side wall of the press vat.

Like numerals on different figures represent like parts of the apparatus.

In my experiments I have endeavored to evolve an apparatus and process for securing the best results in preparing the edible portion of the soy bean into a form for ready use and which can be preserved for several days, and is thus particularly useful for restaurants where this form of food may be required for service on short notice. The product is found very nutritious and pleasant to eat, both in soups and for desserts, with or without cream and sugar, or with fruits, etc. The process in general consists in first soaking the beans, then grinding or pulverizing them, then straining out the skins, then adding other ingredients, and finally pressing and shaping for use.

Referring to the drawing, the numeral 2 shows a rotatable mill stone resting on a fixed stone 3, and held in place by a step bearing 6. The stone 2 is turned by a shaft 8, and at the top of this shaft is a head 7 to which is fixed a sweep bar 7' for turning the stone 2.

The numeral 9 represents a hopper into which soaked beans are placed, and a hole 10 in one side of the stone 2 permits the beans to fall through onto the surface of stone 3, while a suitable supply of water drops from the tube 27; and as the upper stone turns the beans are ground between the stones into a paste or pulp which falls into the tray 4 and thence over the chute 11 into the receptacle 5. Before being ground the beans are soaked in water from ten to twelve hours, with about twice the bulk of water as supply of beans.

From the receptacle 5 the pulp is slowly poured into boiling water, the water being about twice the bulk of the original supply of beans, and the mass of bean paste kept in a boiling condition from fifteen to twenty minutes; and while being so boiled, I add to the mass a mixture of lime and oil which will cause the foam on the surface to sink. This mixture is prepared by adding together three parts slaked lime and seven parts of edible vegetable oil, the latter being extracted from peanuts, olives, etc.; and I use preferably 7/20 of a pint of the mixture to an original quantity of six gallons of beans.

After the mass has been so boiled and the foam has disappeared, it is poured into a coarse mesh sack which, referring to Fig. 3, is shown at 18 in section with the contents at 13. The sack is placed in a suitable box 14 whose bottom plate 14ᵃ is provided with perforations 14ᵇ, and said box is supported on bars 14ᶜ across a suitable pan 5'. The sack is tied or sewed to hold the mass in a close space within the walls of the box 14, and a follower or press head 15 is placed upon the closed sack with any suitable weight 16 for pressure. When desirable a lever 17 with an additional weight 17' may be used, which lever is supported by the weight 16 as a fulcrum. As the weight presses on the mass in the sack the bulk or most of the bean pulp passes through the sack mesh and down through the holes 14ᵇ and upon a finer meshed strainer cloth 19 which is spread across the top of the pan 5', and any particles of the bean skins which may have passed through the sack will be strained out by the cloth 19 and the edible portion of the mass pass down into the pan.

After the pulp has been deposited in the pan I add to the surface of the mass salt water of a density measuring 23 degrees on a standard hydrometer, substantially in the following manner: First I add 2/5 of a pint and cover the pan for five minutes, then add 2/5 of a pint again and again cover for five minutes, I then add 3/10 more of same saline solution, and allow the pan to stand covered for seven minutes, and then add 3/20 more of same solution and allow to again remain covered for five minutes. After the first and each subsequent addition of the saline solution, I loosen the pulp from the sides of the pan by slowly moving around therein a thin wooden paddle two times, then I shove the paddle down to the bottom with its flat face at right angles to the side of the pan and press down the handle in such manner that the flat blade will cut through the mass along the bottom until the end of the blade has reached a point at the center of the pan, when I press the outer end of the handle and cause the other or paddle end to cut up through the mass to its surface. I then cut through the mass in the same manner from the other three sides of the pan, making four cross cuts to the center at equal distances from each other around the edge. The saline solution sufficiently enters the mass ordinarily by the above operations to produce the desired condition of the pulp, when it should be of an orange color; but if the surface has spots of white and orange, a small additional quantity of the salt water may be added and the contents of the pan again covered for five minutes.

When the pulp has obtained the proper consistency as described it is poured from the pan into a vat, shown as Fig. 4, with drainage holes 21 in the sides 20 and holes and grooves 23 in the bottom. A close meshed cloth 25 is however first placed over the bottom and up the side walls, and its upraised sides folded down over the top surface of the pulp, and then a coarse absorbent cloth 26 is laid over the folds and a follower or press head 15' placed thereon with a weight 24 of about six pounds. This is allowed to stand for about ten minutes, when much of the water will have been squeezed out through the drain holes and the top cloth saturated. The operator then removes the pressure and wrings the cloth 26 to remove all water possible, and again places it as before, with a greater weight of about 50 pounds. This is allowed to so stand for about fifteen minutes, when the top cloth is removed and a test made by placing the open palm of the hand upon the mass of pulp and shaking the hand gently. If a proper condition exists the mass will shake like jelly immediately below the hand, but if a large area of the mass shakes with the motion of the hand then the cloth and cover should be replaced after wringing out cloth 26 and a weight of about ten pounds placed on the follower and allowed to stand for about five more minutes or until the proper jelly-like condition has been found. The operator may then remove the cover or follower 15' and, after unfolding and removing the top cloth 26, lift the bottom board of the vat supporting the jelly-like mass on the cloth 25. Thus it is carried to and deposited in a larger vat of cold water, where the mass may be at once cut into small pieces, preferably cubes as shown in Fig. 1, and allowed to stand in the cold water until required for use on the dining table or for culinary purposes in the kitchen.

What I claim is:

1. A process for making bean jelly which consists in soaking the beans in water, pulverizing the same, straining the skins from the bean pulp, adding water and boiling the pulp, adding lime and oil to the mass, pressing out surplus water, adding a saline solution, and again pressing until the mass is of a jelly-like consistency.

2. A process for making bean jelly which consists in soaking the beans in water, grinding them and removing the skins from the pulp, adding water to the latter and boiling, pressing the surplus water out of the mass so produced, adding a saline solution, and again pressing until the mass is of a jelly-like consistency.

3. A process for making bean jelly which consists in soaking the beans in water, grinding them and removing the skins from the pulp, adding lime and oil to the latter, and pressing out the surplus liquid until the mass is of a jelly-like consistency.

4. A process for making cubes from bean jelly which consists in first soaking the beans in water, next pulverizing the same, next straining the skins from the pulp, next adding water and boiling, next adding lime to the mass, next pressing out surplus water, next adding a saline solution to the mass, next pressing it down until the mass is of a jelly-like consistency, and finally cutting the jelly into cubes.

5. An edible product in cubical form or the like, produced from a jelly made of pulverized soy beans with the skins removed.

In testimony whereof I affix my signature.

KAMEKICHI MURAKAMI.